(12) United States Patent
Kirmani

(10) Patent No.: US 10,061,025 B2
(45) Date of Patent: *Aug. 28, 2018

(54) METHODS AND APPARATUSES FOR RECONSTRUCTING A 3D SONAR IMAGE

(71) Applicant: Navico Holdings AS, Egersund (NO)

(72) Inventor: Shahzad F. Kirmani, Scarborough, ME (US)

(73) Assignee: NAVICO HOLDING AS, Egersund (NO)

( * ) Notice: Subject to any disclaimer, the term of this patent is extended or adjusted under 35 U.S.C. 154(b) by 229 days.

This patent is subject to a terminal disclaimer.

(21) Appl. No.: 15/060,032

(22) Filed: Mar. 3, 2016

(65) Prior Publication Data

US 2016/0259052 A1    Sep. 8, 2016

Related U.S. Application Data

(60) Provisional application No. 62/128,641, filed on Mar. 5, 2015.

(51) Int. Cl.
*G01S 15/00* (2006.01)
*G01S 15/89* (2006.01)
(Continued)

(52) U.S. Cl.
CPC .............. *G01S 15/89* (2013.01); *G01S 7/527* (2013.01); *G01S 7/6245* (2013.01); *G01S 15/8902* (2013.01)

(58) Field of Classification Search
CPC ..................... G01S 15/8902; G01S 7/527
See application file for complete search history.

(56) References Cited

U.S. PATENT DOCUMENTS 5,537,380 A    7/1996    Sprankle, Jr. et al.
6,449,215 B1    9/2002    Shell
(Continued)

FOREIGN PATENT DOCUMENTS

CN    102446367 B    3/2013
JP    H07270523 A    10/1995
JP    3 558300 B2    8/2004

OTHER PUBLICATIONS

Canadian Office Action for Application 2,922,781 dated Feb. 9, 2017.
(Continued)

*Primary Examiner* — Hovhannes Baghdasaryan
(74) *Attorney, Agent, or Firm* — Nelson Mullins Riley & Scarborough LLP

(57) ABSTRACT

Methods, apparatuses, and computer program products are provided for producing a 3D image of an underwater environment. 2D sonar return data that defines an angle and distance value may be taken from a theoretical 2D slice of the underwater environment. Multiple sets of 2D sonar return data are taken from corresponding 2D slices of the underwater environment during travel. The multiple sets of 2D sonar return data can be inputted into a 3D point cloud/matrix based on the distance value and angle and the corresponding 2D slice associated with each sonar return. The 3D point cloud/matrix can then be processed to determine a cluster of sonar returns that correspond to the bottom surface. Additional filtering may be performed and the bottom surface can be reconstructed to form a 3D image for display to a user.

18 Claims, 12 Drawing Sheets

(51) Int. Cl.
*G01S 7/527* (2006.01)
*G01S 7/62* (2006.01)

(56) References Cited

U.S. PATENT DOCUMENTS

| | | |
|---|---|---|
| 8,305,840 B2 | 11/2012 | Maguire |
| 9,664,783 B2 | 5/2017 | Brown et al. |
| 9,702,966 B2 | 7/2017 | Batcheller et al. |
| 9,766,328 B2 | 9/2017 | Black et al. |
| 9,784,825 B2 | 10/2017 | Brown et al. |
| 9,784,826 B2 | 10/2017 | Matson et al. |
| 9,812,118 B2 | 11/2017 | Matson et al. |
| 2003/0209893 A1 | 11/2003 | Breed et al. |
| 2003/0235112 A1 | 12/2003 | Zimmerman et al. |
| 2004/0129478 A1 | 7/2004 | Breed et al. |
| 2005/0007880 A1 | 1/2005 | Zimmerman et al. |
| 2005/0099887 A1* | 5/2005 | Zimmerman ....... G01S 7/52003 367/12 |
| 2007/0159922 A1 | 7/2007 | Zimmerman et al. |
| 2012/0099395 A1 | 4/2012 | Debrunner et al. |
| 2013/0148471 A1 | 6/2013 | Brown et al. |
| 2013/0242700 A1* | 9/2013 | Blake ..................... G01S 15/89 367/88 |
| 2014/0064032 A1 | 3/2014 | Sloss |
| 2015/0312526 A1 | 10/2015 | Coleman et al. |
| 2016/0306040 A1 | 10/2016 | Hunt et al. |
| 2017/0123062 A1 | 5/2017 | Coleman et al. |
| 2017/0212230 A1 | 7/2017 | Wigh et al. |

OTHER PUBLICATIONS

Australian Patent Examination Report for Australian Application 2016201479 dated Mar. 27, 2017.
Zhang, L. et al. "3D Reconstruction of seabed surface through sonar data of AUV's", Indian Journal of Geo-Marine Sciences, vol. 41(6), Dec. 2012, pp. 509-515.
U.S. Appl. No. 62/128,635, filed Mar. 5, 2015, In re: Proctor et al. entitled *Systems and Associated Methods for Producing a 3D Sonar Image*.
Olex: Main Page; *Automatic Seabed Charting* (1 pg.); website visited Jun. 23, 2016; http://www.olex.no/index_e.html.
Rusu et al.: "Print Cloud Library (PCL)"; http://www.pointclouds.org/about/ , 4 pages.
Wikipedia; *Delaunay triangulation*; Retrieved Jul. 27, 2016 <https://en.wikipedia.org/wiki/Delaunay_triangulation>.
Australian Patent Examination Report for Australian Application 2016201479 dated Nov. 2, 2016.
European Extended Search Report for European Application No. EP 16159017 dated Dec. 13, 2016.

\* cited by examiner

Sonar Returns

Filtered Sonar Returns - Floor

METHODS AND APPARATUSES FOR RECONSTRUCTING A 3D SONAR IMAGE

RELATED APPLICATION

The present application claims the benefit of U.S. Provisional Application No. 62/128,641, entitled "Methods And Apparatuses for Reconstructing a 3D Sonar Image," filed on Mar. 5, 2015, the content of which is incorporated by reference herein in its entirety.

TECHNOLOGICAL FIELD

Embodiments of the present invention relate generally to sonar systems and, more particularly, to methods and apparatuses for processing 2D sonar returns to produce a 3D image of an underwater environment.

BACKGROUND

Sonar (SOund Navigation And Ranging) has long been used to detect waterborne or underwater objects. For example, sonar devices may be used to determine depth and bottom topography, detect fish, locate wreckage, etc. Sonar transducer elements, or simply transducers, may convert electrical energy into sound or vibrations at a particular frequency. A sonar sound beam is transmitted into and through the water and is reflected from objects it encounters. The transducer may receive the reflected sound (the "sonar returns") and convert the sound energy into electrical energy. These sonar returns provide time data that represents the time taken by the sound wave to travel from the transducer to the object and return as sonar returns to the transducer. Using the time in combination with the known speed of sound, a distance to the location of each sonar return may be determined.

In order to resolve the structure of the underwater environment and provide a detailed and intuitive image to the user, improved sonar systems are required. Applicant has further identified a number of deficiencies and problems associated with conventional sonar systems and other associated systems. Through applied effort, ingenuity, and innovation, many of these identified problems have been solved by developing solutions that are included in embodiments of the present invention, many examples of which are described in detail herein.

BRIEF SUMMARY

Methods, apparatuses, and computer program products are therefore provided according to example embodiments of the present invention for producing a 3D image of an underwater environment. Embodiments of the present invention provide for building a continuous surface geometry based on sonar returns from a lake, sea, or river "floor." Additionally or alternatively, in some embodiments, additional features of the underwater environment may be determined and presented in a 3D image, such as along with the displayed surface geometry of the sea floor.

In this regard, 2D sonar return data is received by one or more transducer elements. In some embodiments, the transducer elements are configured in an array that enables determination of a distance value, a strength value, and an angle associated with each return. The 2D sonar return data is taken from a theoretical 2D slice of the underwater environment. As the watercraft travels along the surface, multiple sets of 2D sonar return data are taken from corresponding 2D slices of the underwater environment. The multiple sets of 2D sonar return data can be inputted into a 3D point cloud based on the distance value and angle and the corresponding 2D slice associated with each sonar return. The 3D point cloud can then be processed to determine a cluster of sonar returns that correspond to the surface (or other object). Those sonar returns can be reconstructed to form a 3D image for display to a user.

In one embodiment, a method for imaging an underwater environment, wherein the underwater environment defines a bottom surface, the method comprising: receiving a set of 2D sonar return data received by at least one transducer element traversing a body of water; generating, by a sonar signal processor, a 3D matrix based on a plurality of sets of 2D sonar return data received as the at least one transducer element traverses the body of water, wherein the 3D matrix comprises a plurality of sonar returns defined by each of the received plurality of sets of 2D sonar return data, wherein each of the plurality of sonar returns defines a strength value, a distance value, and an angle; determining, based on at least the angle of each of the plurality of sonar returns and at least one of the strength value or the distance value of each of the plurality of sonar returns, a group of some of the plurality of sonar returns in the 3D matrix that correspond to the bottom surface of the underwater environment; and generating a 3D representation of the bottom surface of the underwater environment based on the group of some of the plurality of sonar returns in the 3D matrix.

In some embodiments, the method may further comprise displaying the 3D representation of the bottom surface of the underwater environment.

In some embodiments, determining the group of some of the plurality of sonar returns in the 3D matrix further comprises generating, based on the distance value and the angle of each of the plurality of sonar returns, a 3D representation of all of the plurality of sonar returns in the 3D matrix such that each of the plurality of sonar returns defines an x coordinate, a y coordinate, and a z coordinate; and determining at least one cluster of some of the plurality of sonar returns in the 3D representation, wherein the at least one cluster of some of the plurality of sonar returns in the 3D representation comprises sonar returns that are within a threshold distance of each other within the 3D representation; and determining the group of some of the plurality of sonar returns in the 3D matrix that correspond to the bottom surface of the underwater environment by determining the at least one cluster with the largest number of sonar returns.

In some embodiments, the method may further comprise filtering the group of some of the plurality of sonar returns in the 3D matrix that corresponds to the bottom surface to ensure that sonar returns with matching x coordinates and y coordinate do not have different z coordinates.

In some embodiments, generating the 3D representation of the bottom surface of the underwater environment further comprises generating a 2D surface of triangles with points, wherein each point of each triangle defines the x coordinate and the y coordinate of each sonar return from the group of some of the plurality of sonar returns that correspond to the bottom surface of the underwater environment; and updating each point of the triangles of the 2D surface with the z coordinate of the corresponding sonar return from the group of some of the plurality of sonar returns that correspond to the bottom surface of the underwater environment to generate the 3D representation.

In some embodiments, generating the 3D representation of the bottom surface of the underwater environment further comprises scaling the 3D representation to real-world coordinates.

In some embodiments, generating the 3D representation of the bottom surface of the underwater environment further comprises defining a transparency value of each of the group of some of the plurality of sonar returns that correspond to the bottom surface of the underwater environment based on the strength value of each sonar return.

In some embodiments, the method may further comprise filtering each set of 2D sonar return data based on the angle and the strength value for each of the plurality of sonar returns in the 3D matrix corresponding to each set of 2D sonar return data.

In some embodiments, filtering each set of 2D sonar return data further comprises removing any sonar return from each set of 2D sonar return data that does not have the highest strength value among sonar returns within a range of angles.

In some embodiments, the method may further comprise filtering the plurality of sonar returns in the 3D matrix by removing sonar returns determined to be outside at least one of a threshold distance from another sonar return or threshold strength value.

In some embodiments, the plurality of sets of 2D sonar data define a first plurality of sets of 2D sonar data and the 3D representation of the bottom surface of the underwater environment defines a first 3D representation of the bottom surface of the underwater environment. In such embodiments, the method further comprises generating a second 3D matrix based on a second plurality of sets of 2D sonar return data received as the at least one transducer element traverses the body of water, wherein the second 3D matrix comprises a second plurality of sonar returns defined by each of the received second plurality of sets of 2D sonar return data, wherein each of the second plurality of sonar returns defines a strength value, a distance value, and an angle, wherein the second plurality of sets of 2D sonar return data are subsequently received after the first plurality of sets of 2D sonar return data; determining, based on at least the angle of each of the second plurality of sonar returns and at least one of the strength value or the distance value of each of the second plurality of sonar returns, a group of some of the second plurality of sonar returns in the second 3D matrix that correspond to the bottom surface of the underwater environment; and generating a second 3D representation of the bottom surface of the underwater environment based on the group of some of the second plurality of sonar returns in the second 3D matrix.

In some embodiments, the method may further comprise updating at least a portion of the first 3D representation of the bottom surface of the underwater environment near an end of the first 3D representation based on at least a portion of the second 3D representation of the bottom surface of the underwater environment near a beginning of the second 3D representation.

In some embodiments, updating at least the portion of the first 3D representation further comprises updating a z coordinate of points within a threshold distance of the end of the first 3D representation to correspond to an average of z coordinates from both points within the threshold distance of the end of the first 3D representation and points within a second threshold distance of the beginning of the second 3D representation.

In another embodiment, an apparatus is provided comprising a sonar signal processor and a memory including computer program code, the memory and the computer program code configured to, with the sonar signal processor, cause the apparatus to: receive a set of 2D sonar return data received by at least one transducer element traversing a body of water; generate a 3D matrix based on a plurality of sets of 2D sonar return data received as the at least one transducer element traverses the body of water, wherein the 3D matrix comprises a plurality of sonar returns defined by each of the received plurality of sets of 2D sonar return data, wherein each of the plurality of sonar returns defines a strength value, a distance value, and an angle; determine, based on at least the angle of each of the plurality of sonar returns and at least one of the strength value or the distance value of each of the plurality of sonar returns, a group of some of the plurality of sonar returns in the 3D matrix that correspond to the bottom surface of the underwater environment; and generate a 3D representation of the bottom surface of the underwater environment based on the group of some of the plurality of sonar returns in the 3D matrix.

In another embodiment, a computer program product is provided comprising a non-transitory computer readable medium having program code portions stored thereon, the program code portions configured, when said program product is run with a sonar signal processor, to: receive a set of 2D sonar return data received by at least one transducer element traversing a body of water; generate a 3D matrix based on a plurality of sets of 2D sonar return data received as the at least one transducer element traverses the body of water, wherein the 3D matrix comprises a plurality of sonar returns defined by each of the received plurality of sets of 2D sonar return data, wherein each of the plurality of sonar returns defines a strength value, a distance value, and an angle; determine, based on at least the angle of each of the plurality of sonar returns and at least one of the strength value or the distance value of each of the plurality of sonar returns, a group of some of the plurality of sonar returns in the 3D matrix that correspond to the bottom surface of the underwater environment; and generate a 3D representation of the bottom surface of the underwater environment based on the group of some of the plurality of sonar returns in the 3D matrix.

BRIEF DESCRIPTION OF THE DRAWINGS

Figure 1:
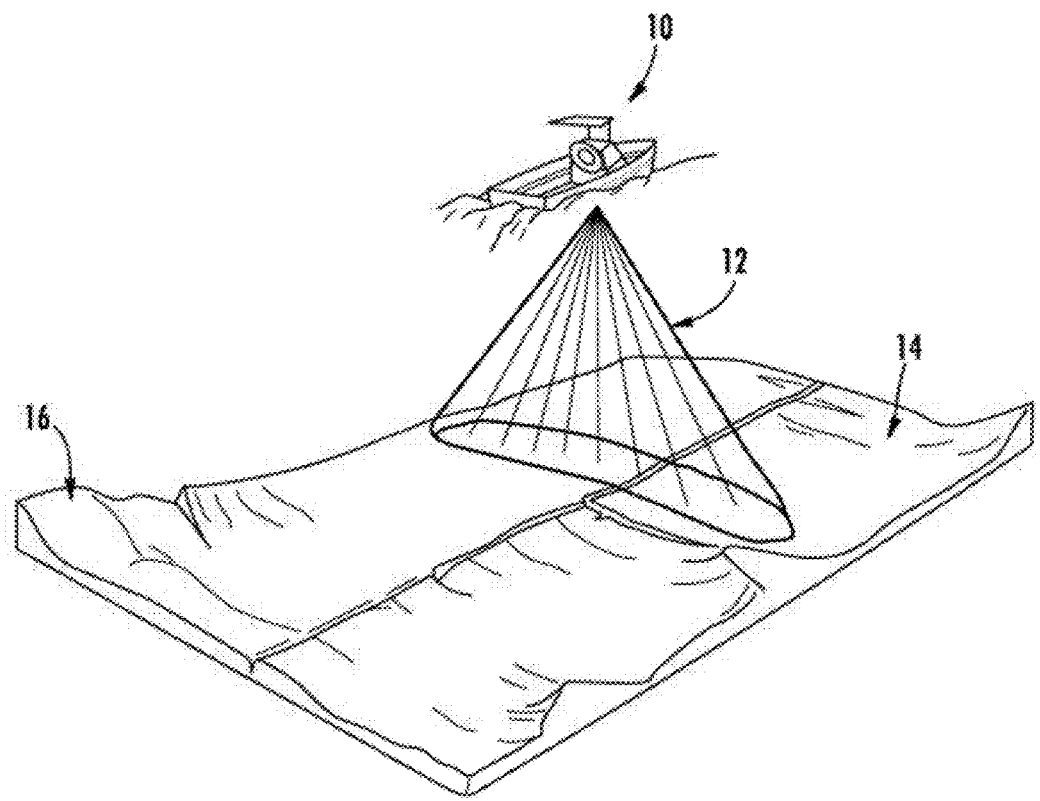
Figure 2A:
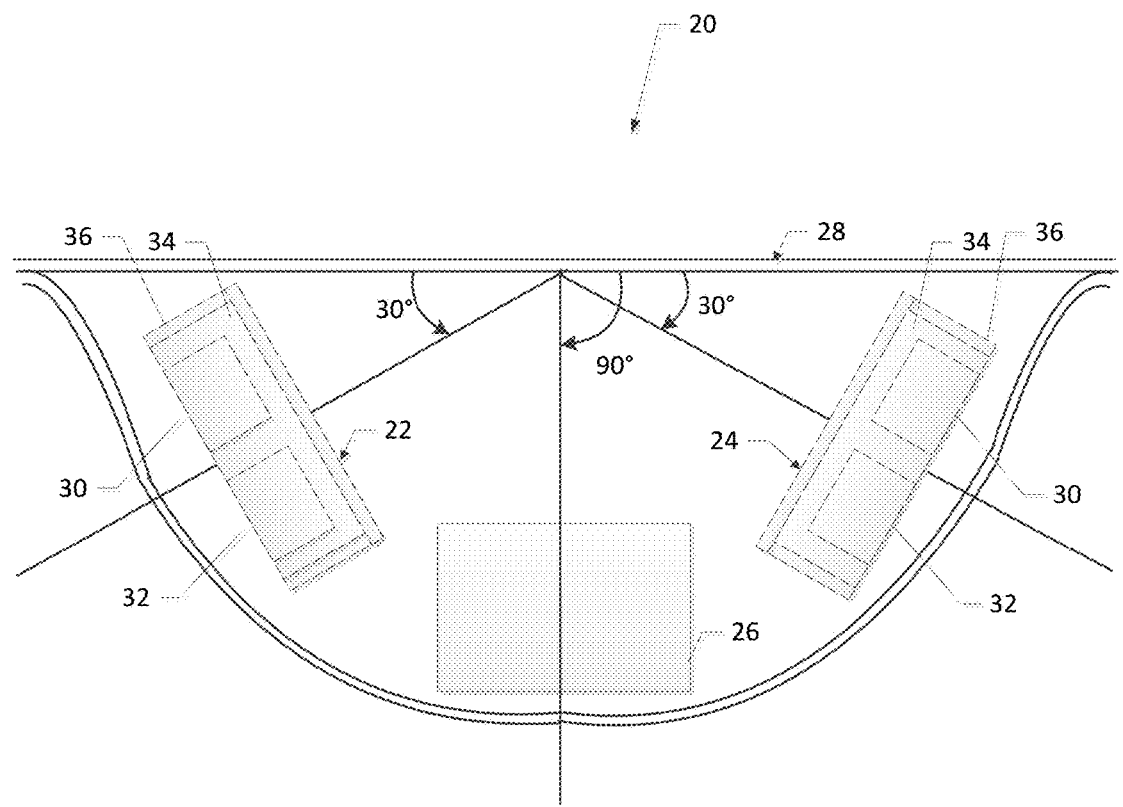
Figure 2B:
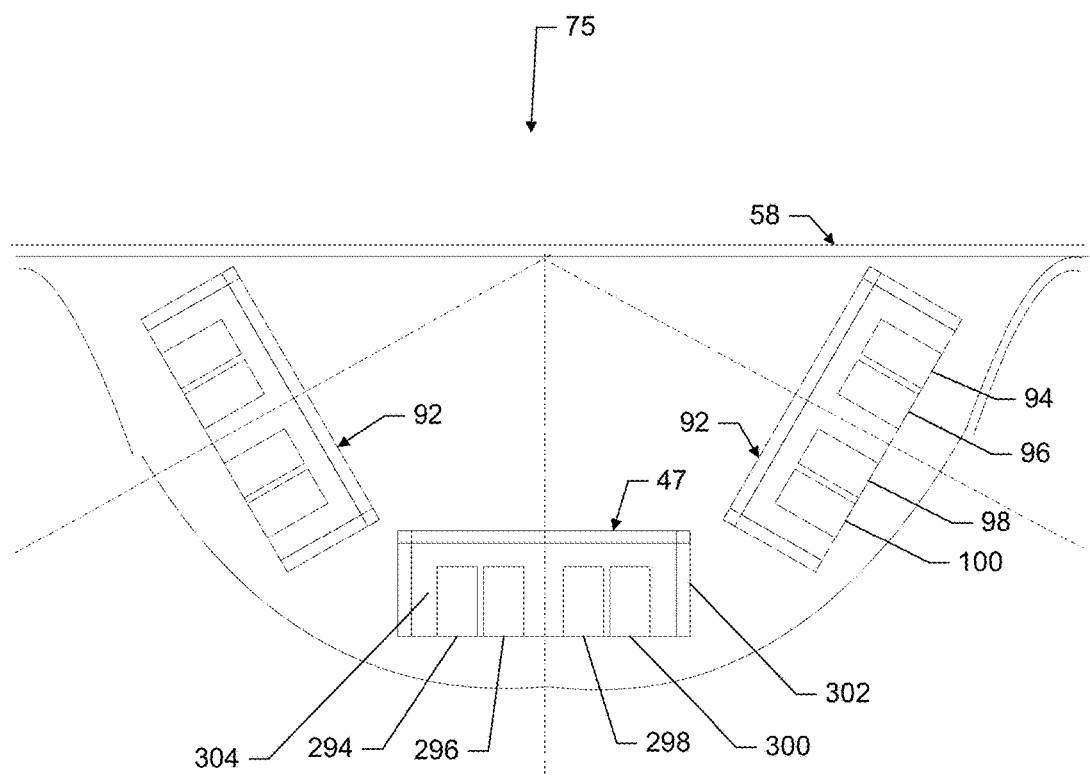
Figure 2C:
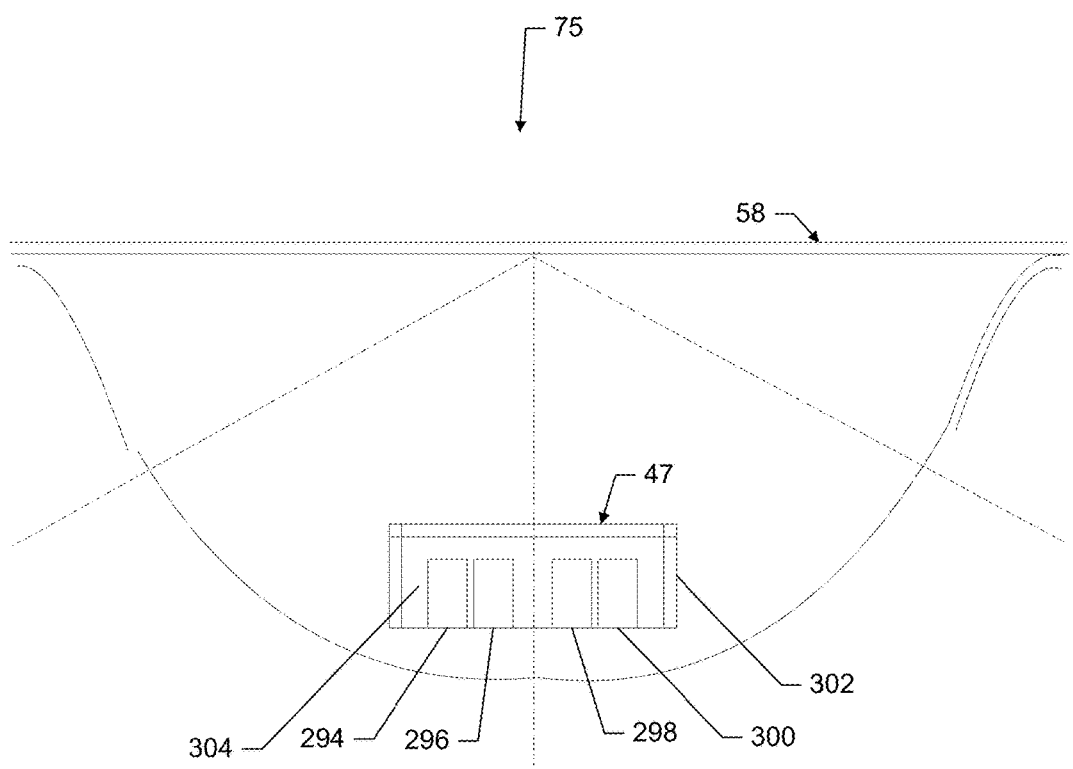
Figure 3:
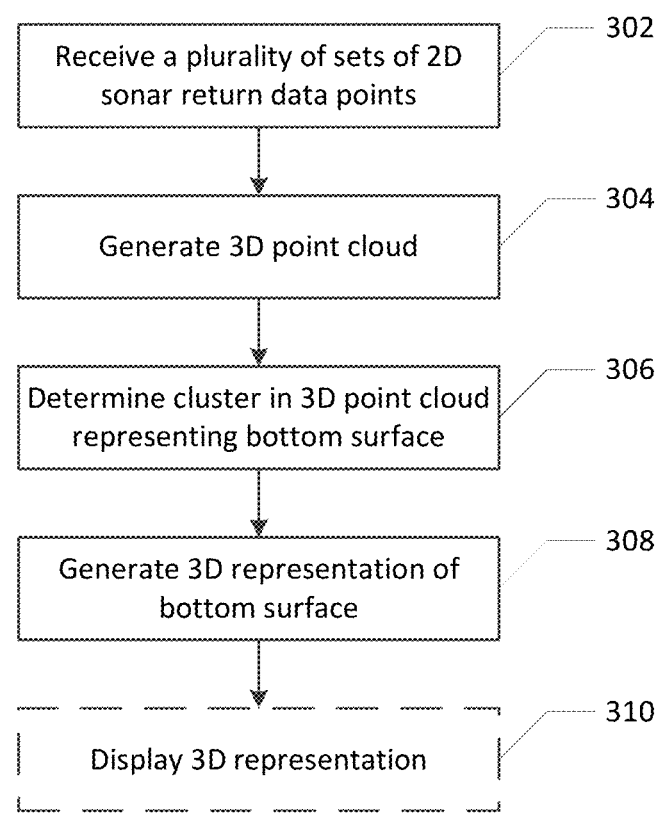
Figure 4:
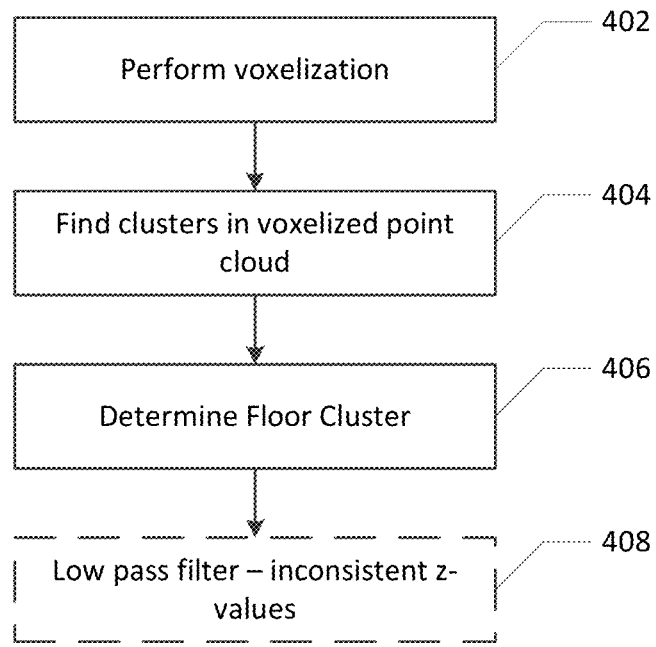
Figure 5:
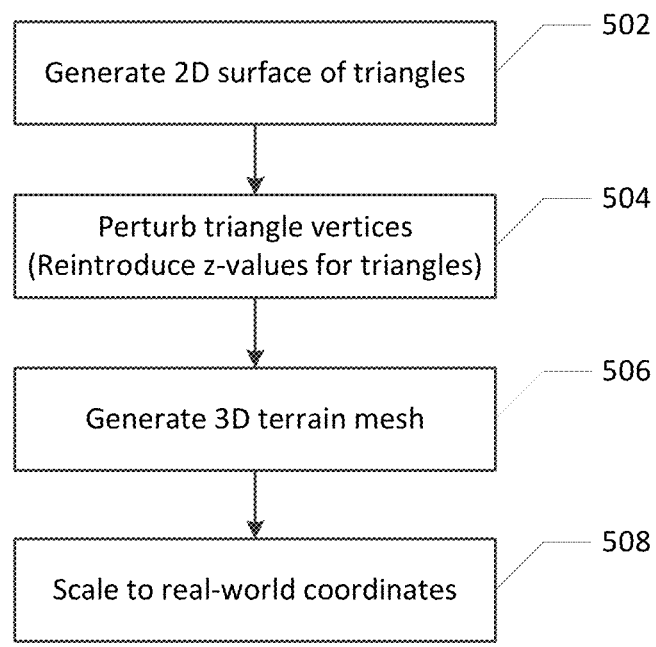
Figure 6A:
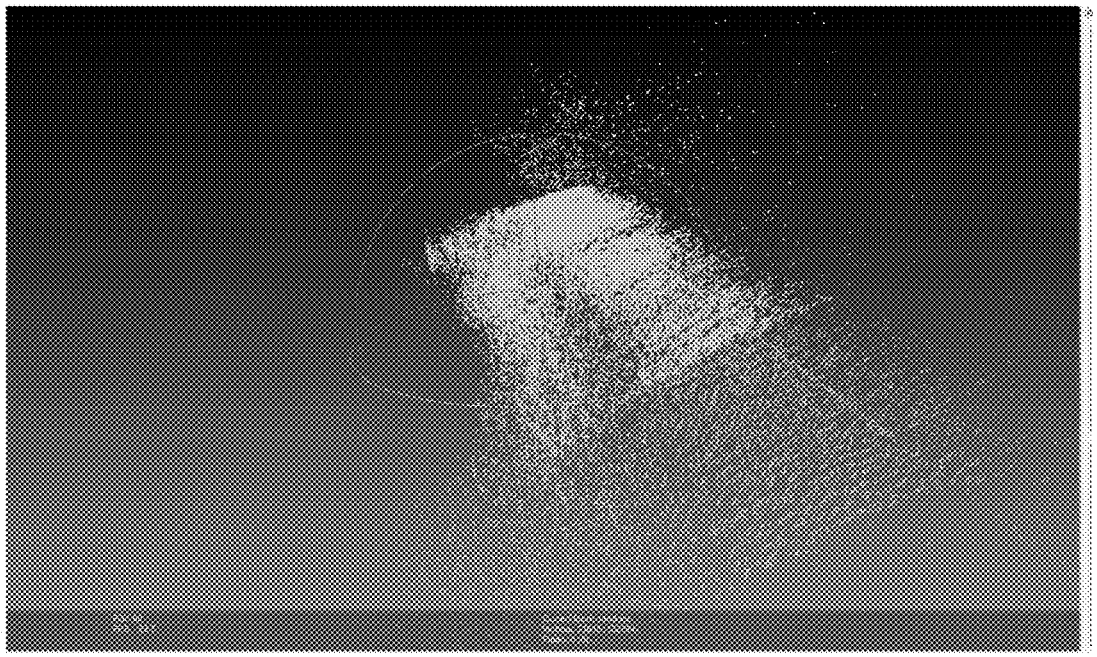
Figure 6B:
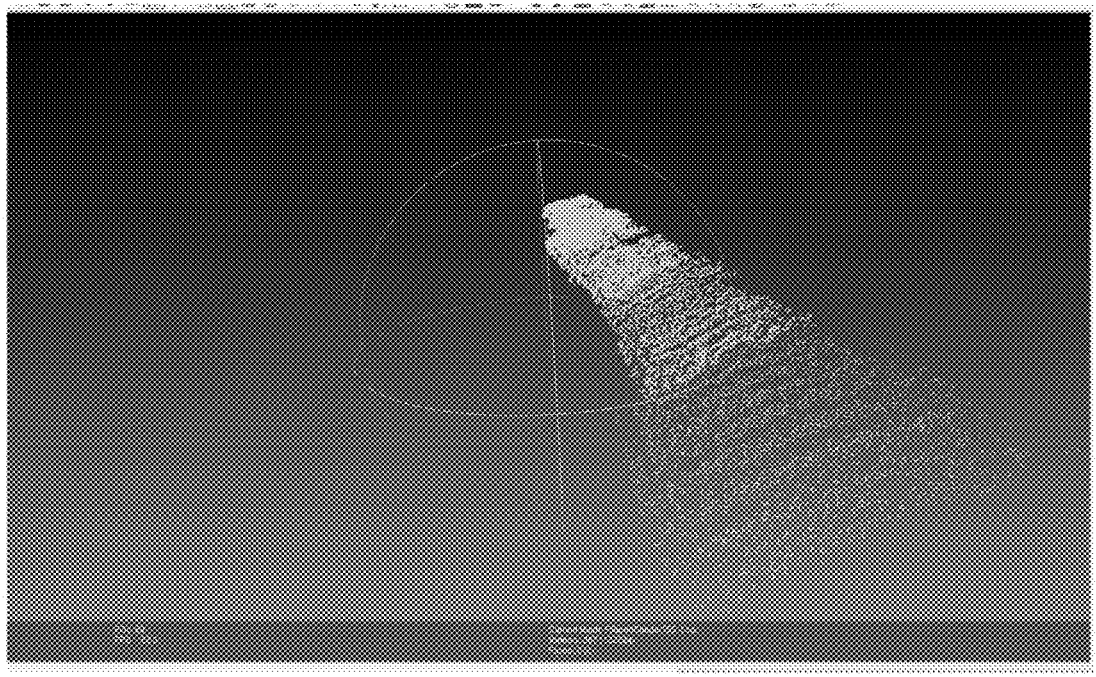
Figure 7:
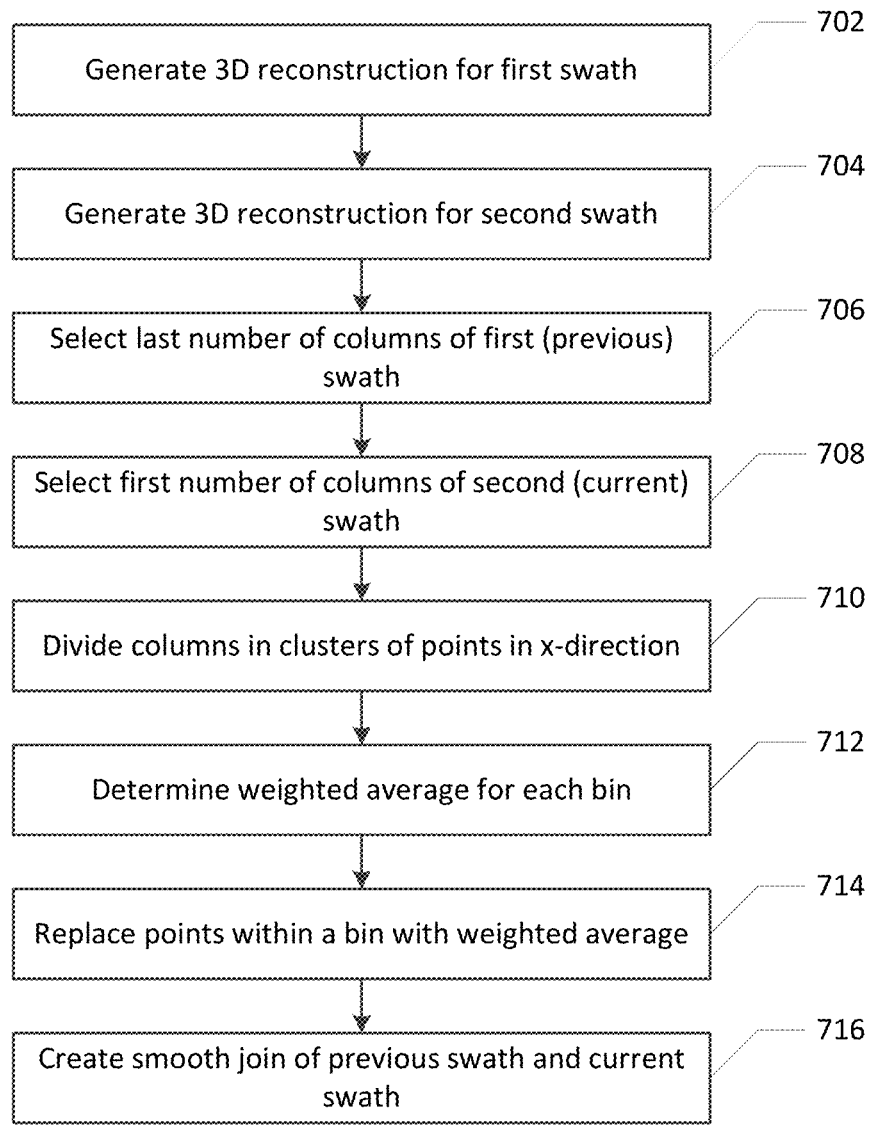
Figure 8A:
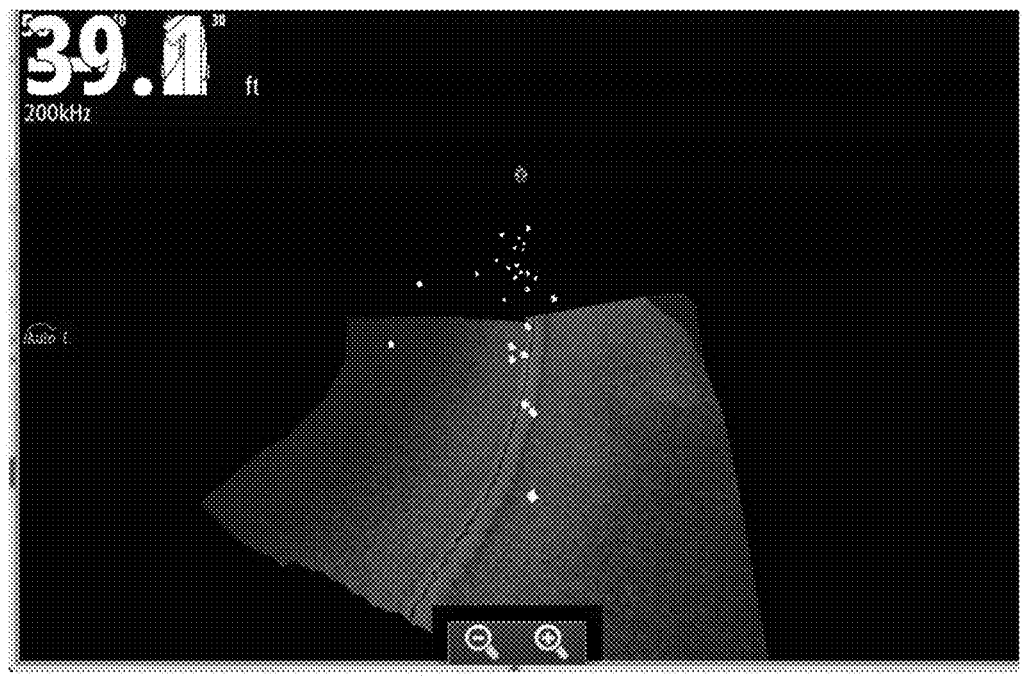
Figure 8B:
Figure 8C:
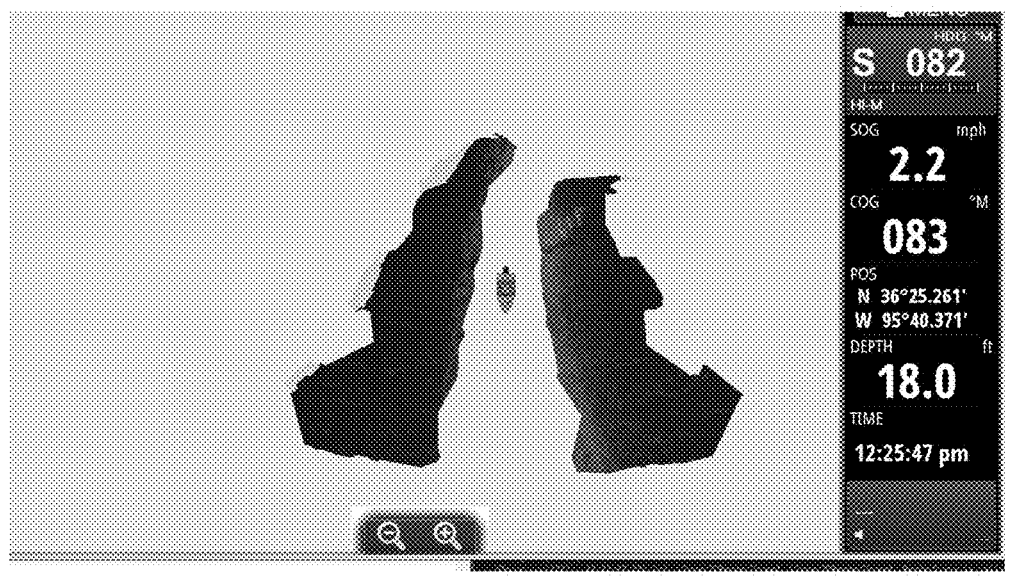
Figure 9:
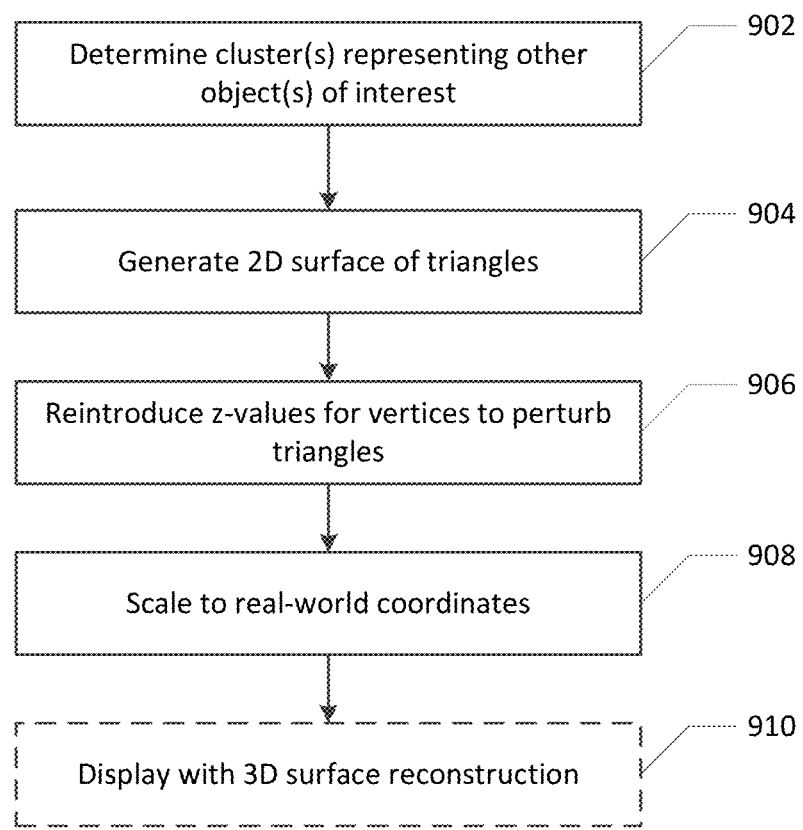
Figure 10:
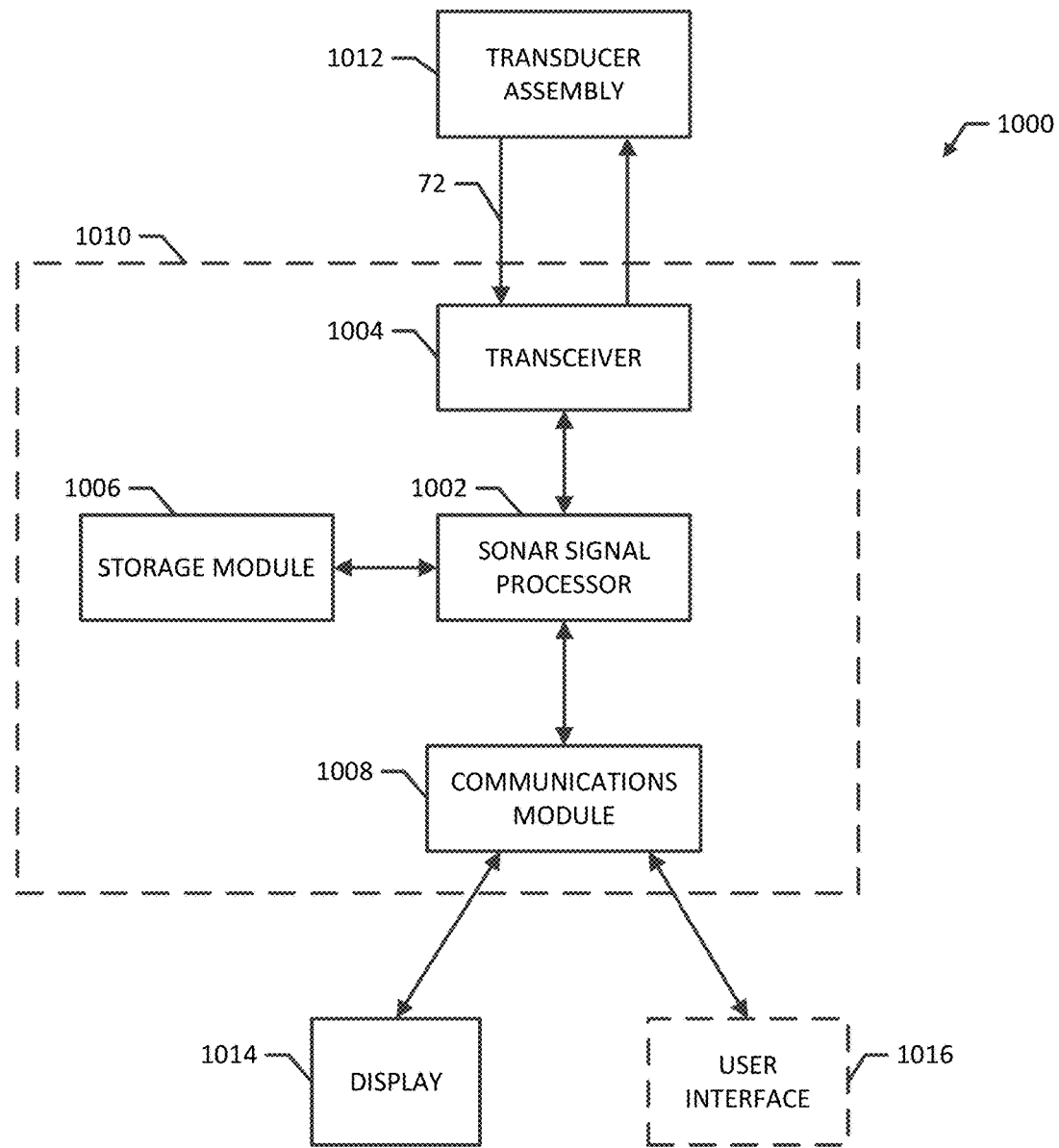

Having thus described certain embodiments of the invention in general terms, reference will now be made to the accompanying drawings, which are not necessarily drawn to scale, and wherein:

FIG. 1 illustrates an example of a sonar transducer emitting sonar pulses from a boat;

FIGS. 2A-2C illustrate cross sectional views of example transducer assemblies capable of being used in accordance with example embodiments of the present invention;

FIG. 3 illustrates a flow chart of exemplary operations for reconstructing a surface using sonar return data performed by an apparatus in accordance with an example embodiment of the present invention;

FIG. 4 illustrates a flow chart of exemplary operations for determining a three dimensional point cloud or matrix performed by an apparatus in accordance with an example embodiment of the present invention;

FIG. 5 illustrates a flow chart of exemplary operations for generating a three dimensional representation performed by an apparatus in accordance with an example embodiment of the present invention;

FIG. 6A illustrates an example series of sonar return data points in accordance with an example embodiment of the present invention;

FIG. 6B illustrates an example series of filtered sonar return data points in accordance with an example embodiment of the present invention;

FIG. 7 illustrates a flow chart of exemplary operations for swath stitching to generate a 3D surface reconstruction in accordance with an example embodiment of the present invention;

FIG. 8A illustrates an example display of a 3D image in accordance with some example embodiments of the present invention;

FIG. 8B illustrates another example display of a 3D image in accordance with some example embodiments of the present invention;

FIG. 8C illustrates another example display of a 3D image in accordance with some example embodiments of the present invention;

FIG. 9 illustrates a flow chart of exemplary operations for generating representation of other objects positioned in the body of water in accordance with an example embodiment of the present invention; and FIG. 10 illustrates a block diagram of an apparatus that may be specifically configured in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

Methods, apparatuses, and computer program products are therefore provided according to example embodiments of the present invention for producing a three dimensional (3D) image of an underwater environment. Embodiments of the present invention provide for building a continuous surface geometry based on side-looking sonar returns from a lake, sea, or river "floor." Additionally or alternatively, in some embodiments, additional features of the underwater environment may be determined and presented in a 3D image, such as along with the displayed surface geometry of the sea floor.

Prior devices may generally gather sonar depth and range data and then post-process it on powerful workstations. Embodiments of the present invention provide improvements that allow for processing to occur in real-time (or with slight delay, as described herein) on a relatively low-powered ARM device, making generation of the 3D reconstruction possible. Embodiments provide computational efficiencies and reduction of the sonar points to match the physical resolution of a system resulting in a fast implementation of the surface reconstruction technique.

Overview of Sonar and Transducer

Sonar systems, such as sonar depth finders, sidescan sonars, downscan sonars, and sonar fish finders, are commonly employed by boaters, sport fishermen, search and rescue personnel, researchers, surveyors, and others. With reference to FIG. 1, a boat 10 may include a sonar system configured to create electrical pulses from a transceiver. A transducer then converts the electrical pulse into sound waves 12, which are sent into the water. In the depicted embodiment, a fan-shaped sound beam (e.g., a beam shape created from one or more linear transducers) is being transmitted into the water, however, as will be apparent to one of ordinary skill in the art in view of this disclosure, other sound beam configurations (e.g., conical shaped, elliptical shaped, multiple conical shaped, etc.) may be transmitted.

When the sound waves 12 strike anything of differing acoustic impedance (e.g., the sea floor or something suspended in the water above the bottom), the sound waves 12 reflect off that object. These echoes or sonar returns may strike the transducer or a separate receiver element, which converts the echoes back into an electrical signal which is processed by a processor (e.g., a sonar signal processor) and sent to a display (e.g., an LCD) mounted in the cabin or other convenient location in the boat. This process is often called "sounding". Since the speed of sound in water is constant (approximately 4800 feet per second in fresh water), the time lapse between the transmitted signal and the received echoes can be measured and the distance to the objects determined. This process repeats itself many times per second. The results of many soundings are used to build a picture on the display of the underwater environment.

For example, the sound waves 12 may bounce off the floor 14 of the body of water and reflect back to the boat, thereby indicating a depth of the water at that location. Sometimes, the floor 14 may have an uneven topography (e.g., a raised surface 16) that may reflect different depths of the water at different locations. In such a circumstance, the sound waves 12 reflect off the various floor surfaces and back to the boat 10. If the raised surface 16 is closer to the boat 10, the sound waves 12 will reach the boat 10 faster and the sonar system will calculate that the depth is shallower at raised surface 16 than at surface 14. Additionally, objects on the floor (e.g., sunken logs, rocks, wreckage of ships, etc.) reflect the sonar beams and are detected as topographical features. Fish in the water also create their own characteristic sonar returns.

In a downscan configuration, a transducer may transmit sound waves 12 directly down beneath the boat 10 and the transducer or another, receiving transducer, may receive downscan sonar returns from an area generally beneath the boat. The number of downscan returns received over time may produce a plot of the distance traveled by each return, which may illustrate the vertical distance to the surface 14 from which the returns are reflected. In a sidescan configuration, a transducer may transmit sound waves 12 to one or both sides of the boat (e.g., in a fan-shaped beam), and the transducer, or a receiving transducer, may receive the sidescan returns. The number of sidescan returns received over time may produce a horizontal plot of the distance to each return, which may illustrate the profile of the surface 14 to either side of the boat.

Embodiments of the present invention may include multiple transducer elements in either or both of a downscan configuration and a sidescan configuration cooperating to receive returns from the underwater environment. The returns may be compared via the process of interferometry to determine the position from which each sonar return originated. In some embodiments, the return data may generate an angle from the transducer to each position from which the returns are received. The angle value may allow the sonar system to plot the position of the returns in three dimensional (3D) space in order to construct a 3D image of the underwater environment.

As detailed herein, embodiments of the present invention may generate 3D mesh images by interferometrically processing returns from the same area of the underwater environment with two or more transducer elements to determine the angle of each return and plot the returns in 3D space. The transducer assembly may emit a fan shaped beam downwardly and outwardly from either side of the boat. In some embodiments, as detailed below, the downscan transducer transmits the fan-shaped beam, and the sidescan transducer arrays receive returns from the sonar pulses transmitted by the downscan transducer. In some alternative embodiments, one or more elements of the sidescan transducer arrays may transmit sonar pulses. Alternatively, a downscan transducer array may be used, either alone or in combination with additional arrays, in a similar manner to the sidescan transducer arrays detailed herein.

FIG. 2 illustrates a cross-sectional view of an example transducer assembly 20. Each sidescan transducer array 22, 24 is shown having two transducer elements 30, 32. In some embodiments, the downscan transducer 26 transmits sonar pulses at least downwardly in a fan-shaped beam, and each of the sidescan transducer arrays 22, 24 is configured to receive returns from the underwater environment on its respective side of the housing. The sidescan transducer arrays 22, 24 may be oriented downwardly and outwardly in their respective directions.

While traditional sidescan may utilize a single sidescan transducer element on either side of the housing for receiving sidescan sonar returns, embodiments of the present invention may use at least two sidescan transducer elements 30, 32 positioned in a sidescan transducer array 22, 24 on the same side of the housing 28. In such embodiments, the sidescan transducer elements 30, 32 may be positioned in parallel mounting slots of an absorptive material 34 within each respective transducer array 22, 24. The transducer arrays 22, 24 may include a shielding material 36 for preventing interference between transducers and improving the return data.

With continuing reference to FIG. 2, the transducer arrays 22, 24 may be held at a predetermined angle relative to the surface of the body of water. For example, the emitting surfaces of the transducer arrays 22, 24 may be oriented at 30 degrees from the surface of the body of water in order to transmit and/or receive sonar pulses. In some embodiments, an emitting surface of the downscan transducer 26 may be perpendicular to the surface of the body of water. The transducer elements 30, 32 may also be positioned at a predetermined distance from each other. The predetermined distance may be designed based on the frequency or wavelength of the sonar pulses. For example, the predetermined distance between the transducer elements 30, 32 may be a fraction or multiple of the wavelength of the sonar pulses (e.g., 1/10, 1/8, 1/6, 1/4, 1/2, 1, 2, 3, or 4 times the wavelength). In some embodiments, the predetermined distance may be less than or equal to half the wavelength of the sonar pulses, as discussed below.

In some embodiments, the downscan transducer element 50 (shown in FIG. 2A) may be replaced with a downscan transducer array 47 as shown in FIG. 2B. The downscan transducer array 47 may include the same structure and function as described herein with respect to the sidescan transducer arrays (e.g., sidescan transducer array 24 shown in FIG. 2A) with the exception of the orientation of the array. In some embodiments the downscan transducer array 47 may be used alone in the housing 58 with no sidescan transducer arrays 92 as shown in FIG. 2C. Additionally, though not shown, one or more transducer arrays (such as the transducer array 24) may be aimed forwardly and downwardly from the watercraft such that the transducer array is configured to be forward looking. Other orientations are also contemplated by embodiments of the present invention.

U.S. Patent Application No. 62/128,635, entitled "Systems and Associated Method for Producing a 3D Sonar Image," filed on Mar. 5, 2015, which is assigned to the same entity as this corresponding application, provides additional detail regarding example transducer systems capable of receiving 2D sonar returns compatible with example embodiments of the present invention, and is hereby incorporated by reference herein in its entirety. Additionally, the above referenced patent application provides additional detail regarding interferometry processing used to determine the angle associated with each sonar return for example 2D sonar return data utilized with example embodiments of the present invention.

Overview of Underwater Environment Reconstruction

Some embodiments of the present invention provide for the generation of a 3D reconstruction of a bottom surface of a body of water, such as a lake, river, or sea floor using sonar return data. Example embodiments provide for the construction of a continuous 3D surface geometry based on side-looking sonar returns from a bottom surface of a body of water.

Sonar returns are generated by a sonar ping and the returned values are represented in two-dimensional (2D) sonar return data. The sonar returns may be received from the sonar ping bouncing back from actual features underwater, or spurious returns from echoes or debris.

In some embodiments, the interferometric return data may be received from two-dimensional slices of the underwater environment (e.g., the fan-shaped beams from linear transducers used in each transducer array have narrow width in the direction of travel of the watercraft—thereby forming a raw 2D sonar data of the underwater environment). In this regard, each sonar return of the raw 2D sonar data may be defined by, at least, a distance and an angle (e.g., 2D). Further, even though there may be some space within the narrow width of the fan-shaped beam, the sonar returns can be defined to ignore that width and, thus, be assumed to be 2D. The raw 2D sonar data may be two dimensional sets of data oriented perpendicular to the direction of travel of the boat (e.g., parallel to the plane of the fan-shaped beam).

The raw 2D sonar data may comprise data from one or more transducer arrays (e.g., the sidescan and/or downscan transducer arrays). For example, in some embodiments, a left or first sidescan transducer array may capture interferometric sonar returns from a portion of a 2D slice on a left side of the boat and a right or second sidescan transducer array may capture interferometric sonar returns from a portion of a 2D slice an opposite or right side of the boat. In such embodiments, the raw 2D sonar data may be defined by joining the returns from the first and second sidescan transducer arrays to form a single data set. In some embodiments the returns from the first and second sidescan transducer arrays may be joined at an axis representing the line of travel of the boat. In some embodiments a downscan transducer array may be used alone or in combination with one or more sidescan transducer arrays to produce raw 2D sonar data.

Additionally, in some embodiments, the 2D sonar return data may define a strength value associated with the strength of the sonar return, for example in a [0.0, 255.0] range. In such embodiments, each sonar return may define a strength value, a distance value, and an angle.

In some embodiments, each set of sonar returns (corresponding to a set of sonar pulses) as the watercraft travels may generate a single slice of raw 2D sonar data. The plurality of sets of raw 2D sonar data may be built up as the watercraft travels.

Embodiments of the present invention assemble a plurality of these sets of 2D sonar return data in space to generate a 3D point cloud. In assembling the plurality of 2D sonar return data, the distance and angle of each sonar return may be used to define a two-dimensional position in space. Additionally, the associated 2D slice that the sonar return was received in may be applied to define the remaining dimension, thereby populating each sonar return into a 3D point cloud. In this regard, each sonar return can be defined to have an xyz position in space and an associated strength value.

Embodiments of the present invention then determine the bottom surface features of the body of water from the generated 3D point cloud. Sonar returns are also caused from objects like fish and debris floating in the water, in addition to surface features and echoes. Embodiments attempt to filter out noisy returns (e.g., echoes) and returns caused by objects other than the floor surface. Any object on the floor, such as debris, is considered part of the floor when no discernible separation from the floor can be detected by the incident and reflected sonar signal. After the 3D point cloud has been filtered to determine the bottom surface features, a 3D reconstruction of the bottom surface is generated and may then be displayed.

In some embodiments, other objects in the water may also be of interest (e.g., fish, etc.) and those objects may be determined and included along with a display of the 3D bottom surface reconstruction.

FIG. 3 illustrates a flow chart of exemplary operations for reconstructing a surface using sonar return data performed by an apparatus in accordance with an example embodiment of the present invention. Operations may begin at block 302 wherein a plurality of sets of 2D sonar return data are received (as the watercraft travels on the surface of the body of water). Each of the plurality of sets of 2D sonar return data comprises individual sonar returns that correspond to a corresponding 2D slice of the underwater environment in which the sonar return was received. In some embodiments, this 2D sonar return data may be received by one or more transducer elements which are aimed at least one of forwardly, downwardly, or outwardly from a watercraft which is traversing the surface of a body of water. Each of the points in the 2D array may be characterized by the depth and cross-range of the point in space and may comprise a strength value, a distance value, and an angle.

In some embodiments, the incoming sonar returns for each set of 2D sonar return data may be pre-filtered to retain the strongest return in each angular sub-fan of the return, thus, eliminating multiple reflections within an arbitrary sub-fan. In some embodiments, the filtering of the 2D sonar returns may be based on the angle and strength value for each of the return points, such as removing points not having the highest strength value within a range of angles (e.g., the strongest sonar return in each 0.5° sub fan is retained). In some embodiments, more than one sonar return in each sub-fan region is retained (such as the two strongest sonar returns).

At block 304, a 3D matrix is generated, such as by a sonar signal processor, based on the received plurality of sets of 2D sonar return data. In some embodiments, the 3D matrix is built in swaths comprising a defined number (N) of 2D sonar returns. For example, in some embodiments, a 3D point cloud may be generated from a series of fifty sets of 2D sonar return data (e.g., from fifty 2D slices of the underwater environment). Each of the sets of 2D sonar return data may include a different number of points, and in some embodiments, a set of 2D sonar return data may include up to a maximum number (M) of points. As such, each swath which is used in generating a 3D matrix may include up to N×M points.

In some embodiments, a statistical outlier removal filter may be applied to remove points that are not within a certain strength weighted mean and standard deviation based Euclidean distance from each other. This allows for removing stray returns, such as returns caused by echoes or bubbles in the water.

At block 306, clusters of points in the 3D matrix may be determined, such as by a sonar signal processor. For example, a cluster may define a grouping of sonar returns in the 3D matrix that are all within a certain threshold distance of each other or, in some embodiments, a threshold distance from a chosen position. In some embodiments, additional processing techniques could be used, such as weighting the results by strength value to better define accurate clusters. After the 3D matrix clusters have been identified, a determination is made as to which cluster represents the floor or bottom surface of the body of water. In some embodiments, the cluster representing the bottom surface may be determined based on the angles and one or more of the strength values and the distance values associated with each sonar return therein. For example, the largest cluster of sonar returns may be determined to by the cluster associated with the sea floor.

At block 308, a 3D representation or reconstruction of the bottom surface is then generated based on the 3D matrix cluster representing the bottom surface. The xyz coordinates of each point on the cluster may be used in the generation of the reconstruction of the bottom surface such that a continuous surface geometry is formed. In some embodiments, a transparency value may defined for the each of the points based on their strength value and this transparency value may be used in the generation of the reconstruction of the bottom surface. Optionally, at block 310, a display of the 3D reconstruction of the bottom surface may be provided, such as via a user interface or display (e.g., a LCD display).

FIG. 4 illustrates a flow chart of exemplary operations for determining a three dimensional point cloud or matrix, such as performed in block 304 of FIG. 3. At block 402, the 3D matrix is voxelized into a 3D grid space (e.g., a 3D point cloud or 3D representation of the points in the 3D matrix). For example, the distance and angle of each sonar return may be used to define a two-dimensional position in space. Additionally, the associated 2D slice that the sonar return was received in may be applied to define the remaining dimension, thereby populating each sonar return into a 3D point cloud. In this regard, each sonar return can be defined to have an xyz position in space and, in some cases, an associated strength value. The 3D point cloud may have a fixed xyz resolution which may be determined by the physical resolution set by the sonar transducer settings, the nominal speed of the boat and the sonar ping rate. The voxelization has an effect of homogenizing the noisy data in a 3D grid in space and combines all points in a weighted average sense, based on their strength, in a given voxel. The strengths of all points within a given voxel are averaged to assign a strength value to a voxelized return.

At block 404, which in some embodiments may correspond to block 306 in FIG. 3, clusters of points are determined in the voxelized 3D point cloud. The clustering may be performed by calculating the weighted standard deviation of the distance of all of the other points in a swath from a given point. The points within a certain ratio of the weighted standard deviation are included within a cluster for a given point. This results in separating different clusters of points in the point cloud. At block 406, a determination is made as to which cluster represents the bottom surface. In some embodiments, the largest cluster is assumed to be the bottom surface and the points in that cluster are stored for further processing.

At block 408, low-pass filtering is performed on the z-axis depths of the largest cluster in the point cloud, which was determined to be the bottom surface. The low-pass filtering ensures that multiple z values within an xy grid do not exist. The filtering is performed by voxelizing the largest cluster with a z voxel size covering the whole range of depth data. This voxelization-based low-pass filtering may also be done using the strength of the return points as a weight.

FIG. 5 illustrates a flow chart of exemplary operations for generating a three dimensional surface representation based on the 3D point cloud, such as may be performed in block 308 of FIG. 3. At block 502, a 2D surface composed of a list of triangles is generated. The z-value of each point in the largest cluster is ignored and the Delaunay triangulation algorithm is used to determine a list of interconnected triangles forming the 2D surface.

At block 504, the z-values corresponding to each vertex in the 2D surface are reintroduced thus perturbing the triangle vertices in the z-direction and stretching each triangle accordingly, having the effect of recreating a terrain based on the 2D projection of its constituent points. At block 506, a 3D reconstruction of the surface is then generated based on the perturbed 2D surface.

At block 508, the output data of the reconstruction is scaled to real-world coordinates. The strength of each vertex is retained and assigned to the transparency value of that vertex.

The various embodiments described herein provide example methods for forming a 3D image of a portion of the underwater environment. In this regard, in some embodiments, a certain number of 2D slices of sonar returns are captured prior to formation of the corresponding 3D image to enable processing of the sonar returns to form the 3D image. This may form a first swath of data. For example, the watercraft may travel along the surface of the body of water and capture, for example, 50 different 2D slices worth of 2D sonar return data. This may form a first 3D matrix, such as described above. Once the first 3D matrix is formed, the above detailed example processing may occur to form a 3D image corresponding to the underwater environment from the first swath (e.g., the first 50 2D slices).

In some embodiments, in presenting the 3D image, the display may be configured to present only a portion of that 3D image at a time, building up over time to form the 3D image. For example, the data used to form the 3D image may be divided into 50 slices for presentation in a waterfall type manner on the display.

In some embodiments, as the 50 portions of the 3D image are being displayed, 2D sonar return data from a new set of 2D slices is being captured as the watercraft travels. Such new 2D sonar return data can be used to form a second 3D matrix and corresponding 3D image that can be presented in portions, building up over time after the first 3D image is complete.

FIGS. 6A and 6B provide illustrations of example series of sonar return data points in accordance with an example embodiment of the present invention. In FIGS. 6A and 6B, the boat would be positioned to the left of and above the returned data points, and the sonar returns are received by a single sidescan transducer array positioned to the right side of the boat. FIG. 6A illustrates raw data points that may be returned as the boat is traveling along the shore of a body of water. FIG. 6B illustrates filtered floor sonar return points based on the strongest point in a sub-fan.

FIG. 7 illustrates a flow chart of exemplary operations for blending together multiple swaths to generate a larger 3D surface reconstruction in accordance with an example embodiment of the present invention. Because a single 3D point cloud/matrix represents a small number of 2D sonar returns, to generate a larger 3D surface representation, multiple 3D point cloud/matrices swaths may be blended together in succession to generate a larger 3D representation of the bottom surface in some embodiments.

At block 702, a first 3D representation of a bottom surface may be generated as previously described herein. At block 704, a second 3D representation of a bottom surface may be generated as previously described herein. The first 3D representation and the second 3D representation are successive representations that, in some embodiments, may be blended together to form a smooth transitioning 3D image to a user.

At block 706, a number of the last columns of the first 3D representation are selected (e.g., the last 3 returns out of the 50 returns in the point cloud). At block 708, a number of the first columns of the second 3D representation are selected (e.g., the first 3 returns out of the 50 returns in a point cloud).

At block 710, the columns are then divided into clusters of points in the x-direction by assigning the points to a series of bins defined in the x-direction. At block 712, a weighted average of the x-values is determined for all of the points in each of the bins. At block 714, the x-value for each of the points in each of the bins is replaced with the weighted average value for that bin.

At block 716, the representation of the selected columns in the first and second 3D representations is blended by using the new x-values to generate a smooth join of the first and second 3D representations.

Although the above detailed example describes generation of the second 3D representation of the second swath prior to performing the blending, in some embodiments, the smooth transition for blending may occur prior to or in conjunction with generation of the second 3D representation. Further, the blending may occur prior to completion of presentation of the first 3D image (e.g., prior to the final three portions of the first 3D image being presented). In this manner, for example, the last three portions of the first 3D image and the first three portions of the second 3D image may be smoothly presented on the display in proper order such that there is a smooth transition between the first 3D image and the second 3D image. Although the above example uses three portion of the 3D images, any number of portions could be used.

FIG. 8A provides an illustration of a 3D image generated in accordance with some example embodiments of the present invention. Such a 3D surface representation may be generated from the 3D point cloud as discussed in regard to FIG. 5 above. FIG. 8B provides another illustration of a 3D image generated in accordance with some example embodiments of the present invention. FIG. 8C provides another illustration of a 3D image generated in accordance with some example embodiments herein. In some embodiments, the 3D image shown in FIG. 8C may be formed from a transducer assembly that includes two sidescan transducer arrays, such as those shown in FIG. 2A.

In some embodiments, it may be desirable to locate and display other objects that are within the water body along with the 3D representation of the surface. For example, it may be desirable to identify and display fish or other objects positioned in the water along with the display of the bottom surface. In some embodiments, such a combined display may be accomplished by simultaneously performing operations discussed herein in regard to multiple clusters within the 3D point cloud.

FIG. 9 illustrates a flow chart of operations for generating a representation of other objects positioned in the body of water in accordance with an example embodiment of the present invention. The operations discussed in regard to FIG. 9 may, for example, continue from block 306 of FIG. 3. At block 902, a cluster representing an object of interest may be identified.

At block 904, a 2D surface composed of a list of triangles is generated by ignoring the z-value of each point in the selected cluster and determining a list of interconnected triangles forming the 2D surface. At block 906, the z-values corresponding to each vertex in the 2D surface are reintroduced thus perturbing the triangle vertices in the z-direction and stretching each triangle accordingly, generating a 3D representation of the object.

At block 908, the representation is scaled to real-world coordinates and the strength of each vertex is retained and assigned to the transparency value of that vertex.

At block 910, the object may optionally be displayed along with a display of a representation of the bottom surface, such as via a user interface or display (e.g., a LCD display). In addition to or alternate to blocks 904 and 906, the individual sonar returns could be displayed without reconstruction of a surface, thereby providing single sonar return points on the 3D image. Such points may correspond to a fish (or other object) in the water column. Additionally, in some embodiments, the points can be determined to represent a fish and, in response, a pre-set image of a fish could be displayed over (or instead of) the points.

Example Apparatus

The system of an embodiment of the present invention may include an apparatus 1000 as generally described below in conjunction with FIG. 10 for performing one or more of the operations set forth by FIGS. 3-5, 7, and 9 described herein. It should also be noted that while FIG. 10 illustrates one example of a configuration of an apparatus 1000 for reconstructing a surface, numerous other configurations may also be used to implement other embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

FIG. 10 illustrates a basic block diagram of a sonar system 1000 that may be specifically configured in accordance with example embodiments of the present invention. As shown, the sonar system 1000 may include a number of different modules or components, each of which may comprise any device or means embodied in either hardware, software, or a combination of hardware and software configured to perform one or more corresponding functions. For example, the sonar system 1000 may include a sonar signal processor 1002, a transceiver 1004, and a transducer assembly 1012. The sonar system 1000 may further include a storage module 1006 for storing sonar return data and other data associated with the sonar system in a non-transitory computer readable medium. The sonar system 1000 may also include one or more communications modules 1008 configured to communicate with one another in any of a number of different manners including, for example, via a network. In this regard, the communications module 1008 may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays 1014 may be included in the sonar system 1000.

The display 1014 may be configured to display images and may include or otherwise be in communication with a user interface 1016 configured to receive an input from a user. The display 1014 may be, for example, a conventional LCD (liquid crystal display), a touch screen display, mobile device, or any other suitable display known in the art upon which images may be rendered. Although the display 1014 of FIG. 10 is shown as being connected to the sonar signal processor 1002 via the communications module 1008 (e.g., via a network and/or via an Ethernet hub), the display 1014 could alternatively be in direct communication with the sonar signal processor 1002 in some embodiments, or the display 1014, sonar signal processor 1002 and user interface 1016 could be in a single housing. The user interface 1016 may include, for example, a keyboard, keypad, function keys, mouse, scrolling device, input/output ports, touch screen, or any other mechanism by which a user may interface with the system. Moreover, in some cases, the user interface 1016 may be a portion of one or more of the displays 1014.

In an example embodiment, the sonar signal processor 1002, the transceiver 1004, the storage module 1006 and/or the communications module 1008 may form a sonar module 1010. As such, for example, in some cases, the transducer assembly 1012 may simply be placed into communication with the sonar module 1010, which may itself be a mobile device that may be placed (but not necessarily mounted in a fixed arrangement) in the vessel to permit easy installation of one or more displays 1014, each of which may be remotely located from each other and operable independent of each other. In this regard, for example, the communications module 1008 may include one or more corresponding interface ports for placing the network in communication with each display 1014 in a plug-n-play manner. As such, for example, the communications module 1008 may not only include the hardware needed to enable the displays 1014 to be plugged into communication with the network via the communications module, but the communications module 1008 may also include or otherwise be in communication with software modules for providing information to enable the sonar module 1010 to communicate with one or more different instances of the display 1014 that may or may not be the same model or type of display and that may display the same or different information. In other words, the sonar module 1014 may store configuration settings defining a predefined set of display types with which the sonar module is compatible so that if any of the predefined set of display types are placed into communication with the sonar module 1010, the sonar module 1010 may operate in a plug-n-play manner with the corresponding display types. Accordingly, the sonar module 1010 may include the storage device 1006 storing device drivers accessible to the communications module 1008 to enable the sonar module 1010 to properly work with displays for which the sonar module 1010 is compatible. The sonar module 1010 may also be enabled to be upgraded with additional device drivers or transceivers to enable expansion of the numbers and types of devices with which the sonar module 1010 may be compatible. In some cases, the user may select a display type to check whether a display type is supported and, if the display type is not supported, contact a network entity to request software and/or drivers for enabling support of the corresponding display type.

The sonar signal processor 1002 may be any means such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the sonar signal processor 1002 as described herein. In this regard, the sonar signal processor 1002 may be configured to analyze electrical signals communicated thereto by the transceiver 1004 to provide sonar data indicative of the size, location, shape, etc. of objects detected by the sonar system 1000. For example, the sonar signal processor 1002 may be configured to receive sonar return data and process the sonar return data to generate sonar image data for display to a user (e.g., on display 1014). Moreover, in some embodiments, the sonar signal processor 1002 may be configured to receive downscan sonar return data and/or sidescan sonar return data for processing and generation of sonar image data for display to a user.

In some cases, the sonar signal processor 1002 may include a processor, a processing element, a coprocessor, a controller or various other processing means or devices including integrated circuits such as, for example, an ASIC, FPGA or hardware accelerator, that is configured to execute various programmed operations or instructions stored in a memory device. The sonar signal processor 1002 may further or alternatively embody multiple compatible additional hardware or hardware and software items to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other watercraft, etc. Still further, the processor, in combination with the storage module 1006, may store incoming transducer data or screen images for future playback or transfer, or alter images with additional processing to implement zoom or lateral movement, or to correlate data, such as fish or bottom features to a GPS position or temperature. In an exemplary embodiment, the sonar signal processor 1002 may execute commercially available software for controlling the transceiver 1004 and/or transducer assembly 1012 and for processing data received therefrom.

The transceiver 1004 may be any means such as a device or circuitry operating in accordance with software or otherwise embodied in hardware or a combination of hardware and software (e.g., a processor operating under software control or the processor embodied as an ASIC or FPGA specifically configured to perform the operations described herein, or a combination thereof) thereby configuring the device or circuitry to perform the corresponding functions of the transceiver 1004 as described herein. In this regard, for example, the transceiver 1004 may include (or be in communication with) circuitry for providing one or more transmission electrical signals to the transducer assembly 1012 for conversion to sound pressure signals based on the provided electrical signals to be transmitted as a sonar pulse. The 1004 may also include (or be in communication with) circuitry for receiving one or more electrical signals produced by the transducer assembly 1012 responsive to sound pressure signals received at the transducer assembly 1012 based on echo or other return signals received in response to the transmission of a sonar pulse. The transceiver 1004 may be in communication with the sonar signal processor 1002 to both receive instructions regarding the transmission of sonar signals and to provide information on sonar returns to the sonar signal processor 1002 for analysis and ultimately for driving one or more of the displays 1014 based on the sonar returns. In some embodiments, the transmitter circuitry and/or receiver circuitry may be positioned within the transceiver 1004 or sonar module 1010. In other embodiments the transmitter circuitry and/or receiver circuitry may be positioned within the transducer assembly 1012. Likewise, in some embodiments, the transmitter circuitry and/or receiver circuitry may be positioned separate from the transducer assembly 1012 and transceiver 1004/sonar module 1010.

The transducer assembly 1012 according to an exemplary embodiment may be provided in one or more housings that provide for flexible mounting with respect to a hull of the vessel on which the sonar system 1000 is employed. In this regard, for example, the housing may be mounted onto the hull of the vessel or onto a device or component that may be attached to the hull (e.g., a trolling motor or other steerable device, or another component that is mountable relative to the hull of the vessel), including a bracket that is adjustable on multiple axes, permitting omnidirectional movement of the housing.

The transducer assembly 1012 may include one or more transducer elements and/or transducer arrays positioned within the housing, as described in greater detail herein. In some embodiments, each of the transducer elements may be positioned within the housing so as to point toward a predetermined area under or to the side of the vessel.

The transducer elements can convert electrical energy into sound energy (i.e., transmit) and also convert sound energy (e.g., via detected pressure changes) into an electrical signal (i.e., receive), although some transducers may act only as a hydrophone for converting sound energy into an electrical signal without operating as a transmitter, or only operating to convert an electrical signal into sound energy without operating as a receiver. Depending on the desired operation of the transducer assembly, each of the transducer elements may be configured to transmit sonar pulses and/or receive sonar returns as desired. In some embodiments, the transducer assembly 1012 may comprise a combination of transducer elements and/or arrays that are configured to transmit sonar pulses and receive sonar returns, transducer elements that are configured to transmit sonar pulses only, and/or transducer elements that are configured to receive sonar returns only.

As described above, FIGS. 3-5, 7, and 9 illustrate flowcharts of an apparatus, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as shown by the blocks with dashed outlines. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

That which is claimed:

1. A method for imaging an underwater environment, wherein the underwater environment defines a bottom surface, the method comprising:
receiving a set of 2D sonar return data received by at least two transducer elements traversing a body of water;
generating, by a sonar signal processor, a 3D matrix based on a plurality of sets of 2D sonar return data received as the at least one transducer element traverses the body of water, wherein the 3D matrix comprises a plurality of sonar returns defined by each of the received plurality of sets of 2D sonar return data, wherein each of the plurality of sonar returns defines a strength value, a distance value, and an angle;
determining, based on at least the angle of each of the plurality of sonar returns and at least one of the strength value or the distance value of each of the plurality of sonar returns, a group of some of the plurality of sonar returns in the 3D matrix that correspond to the bottom surface of the underwater environment, wherein determining the group of some of the plurality of sonar returns in the 3D matrix comprises:
generating, based on the distance value and the angle of each of the plurality of sonar returns, a 3D representation of all of the plurality of sonar returns in the 3D matrix such that each of the plurality of sonar returns defines an x coordinate, a y coordinate, and a z coordinate;
determining a plurality of clusters based on at least some of the plurality of sonar returns in the 3D representation, wherein each of the plurality of clusters comprises sonar returns that are within a threshold distance of each other within the 3D representation; and selecting a cluster with the largest number of sonar returns from among the plurality of clusters such that the sonar returns within the selected cluster form the determined group of some of the plurality of sonar returns in the 3D matrix that correspond to the bottom surface of the underwater environment; and generating a 3D representation of the bottom surface of the underwater environment based on the group of some of the plurality of sonar returns in the 3D matrix.

2. The method of claim 1 further comprising displaying the 3D representation of the bottom surface of the underwater environment.

3. The method of claim 1 further comprising filtering the group of some of the plurality of sonar returns in the 3D matrix that corresponds to the bottom surface to ensure that sonar returns with matching x coordinates and y coordinate do not have different z coordinates.

4. The method of claim 1, wherein generating the 3D representation of the bottom surface of the underwater environment comprises:
generating a 2D surface of triangles with points, wherein each point of each triangle defines the x coordinate and the y coordinate of each sonar return from the group of some of the plurality of sonar returns that correspond to the bottom surface of the underwater environment; and
updating each point of the triangles of the 2D surface with the z coordinate of the corresponding sonar return from the group of some of the plurality of sonar returns that correspond to the bottom surface of the underwater environment to generate the 3D representation.

5. The method of claim 4, wherein generating the 3D representation of the bottom surface of the underwater environment further comprises scaling the 3D representation to real-world coordinates.

6. The method of claim 1, wherein generating the 3D representation of the bottom surface of the underwater environment further comprises defining a transparency value of each of the group of some of the plurality of sonar returns that correspond to the bottom surface of the underwater environment based on the strength value of each sonar return.

7. The method of claim 1 further comprising filtering each set of 2D sonar return data based on the angle and the strength value for each of the plurality of sonar returns in the 3D matrix corresponding to each set of 2D sonar return data.

8. The method of claim 7, wherein filtering each set of 2D sonar return data comprises removing any sonar return from each set of 2D sonar return data that does not have the highest strength value among sonar returns within a range of angles.

9. The method of claim 1 further comprising filtering the plurality of sonar returns in the 3D matrix by removing sonar returns determined to be outside at least one of a threshold distance from another sonar return or threshold strength value.

10. The method of claim 1, wherein the plurality of sets of 2D sonar data define a first plurality of sets of 2D sonar data and the 3D representation of the bottom surface of the underwater environment defines a first 3D representation of the bottom surface of the underwater environment, wherein the method further comprises:
generating a second 3D matrix based on a second plurality of sets of 2D sonar return data received as the at least one transducer element traverses the body of water, wherein the second 3D matrix comprises a second plurality of sonar returns defined by each of the received second plurality of sets of 2D sonar return data, wherein each of the second plurality of sonar returns defines a strength value, a distance value, and an angle, wherein the second plurality of sets of 2D sonar return data are subsequently received after the first plurality of sets of 2D sonar return data;
determining, based on at least the angle of each of the second plurality of sonar returns and at least one of the strength value or the distance value of each of the second plurality of sonar returns, a group of some of the second plurality of sonar returns in the second 3D matrix that correspond to the bottom surface of the underwater environment; and
generating a second 3D representation of the bottom surface of the underwater environment based on the group of some of the second plurality of sonar returns in the second 3D matrix.

11. The method of claim 10 further comprising updating at least a portion of the first 3D representation of the bottom surface of the underwater environment near an end of the first 3D representation based on at least a portion of the second 3D representation of the bottom surface of the underwater environment near a beginning of the second 3D representation.

12. The method of claim 11, wherein updating at least the portion of the first 3D representation comprises updating a z coordinate of points within a threshold distance of the end of the first 3D representation to correspond to an average of z coordinates from both points within the threshold distance of the end of the first 3D representation and points within a second threshold distance of the beginning of the second 3D representation.

13. An apparatus comprising a sonar signal processor and a memory including computer program code, the memory and the computer program code configured to, with the sonar signal processor, cause the apparatus to:
receive a set of 2D sonar return data received by at least two transducer elements traversing a body of water;
generate a 3D matrix based on a plurality of sets of 2D sonar return data received as the at least one transducer element traverses the body of water, wherein the 3D matrix comprises a plurality of sonar returns defined by each of the received plurality of sets of 2D sonar return data, wherein each of the plurality of sonar returns defines a strength value, a distance value, and an angle;
determine, based on at least the angle of each of the plurality of sonar returns and at least one of the strength value or the distance value of each of the plurality of sonar returns, a group of some of the plurality of sonar returns in the 3D matrix that correspond to the bottom surface of the underwater environment, wherein determining the group of some of the plurality of sonar returns in the 3D matrix comprises:
generating, based on the distance value and the angle of each of the plurality of sonar returns, a 3D representation of all of the plurality of sonar returns in the 3D matrix such that each of the plurality of sonar returns defines an x coordinate, a y coordinate, and a z coordinate;
determining a plurality of clusters based on at least some of the plurality of sonar returns in the 3D representation, wherein each of the plurality of clusters comprises sonar returns that are within a threshold distance of each other within the 3D representation; and
selecting a cluster with the largest number of sonar returns from among the plurality of clusters such that the sonar returns within the selected cluster form the determined group of some of the plurality of sonar returns in the 3D matrix that correspond to the bottom surface of the underwater environment; and generate a 3D representation of the bottom surface of the underwater environment based on the group of some of the plurality of sonar returns in the 3D matrix.

14. The apparatus of claim 13 further comprising the memory and the computer program code configured to, with the sonar signal processor, cause the apparatus to display the 3D representation of the bottom surface of the underwater environment.

15. The apparatus of claim 13, wherein generating the 3D representation of the bottom surface of the underwater environment comprises:

generating a 2D surface of triangles with points, wherein each point of each triangle defines the x coordinate and the y coordinate of each sonar return from the group of some of the plurality of sonar returns that correspond to the bottom surface of the underwater environment; and updating each point of the triangles of the 2D surface with the z coordinate of the corresponding sonar return from the group of some of the plurality of sonar returns that correspond to the bottom surface of the underwater environment to generate the 3D representation.

16. The apparatus of claim 13 further comprising the memory and the computer program code configured to, with the sonar signal processor, cause the apparatus to filter each set of 2D sonar return data based on the angle and the strength value for each of the plurality of sonar returns in the 3D matrix corresponding to each set of 2D sonar return data, wherein the filtering comprises removing any sonar return from each set of 2D sonar return data that does not have the highest strength value among sonar returns within a range of angles.

17. Computer program product comprising a non-transitory computer readable medium having program code portions stored thereon, the program code portions configured, when said program product is run with a sonar signal processor, to:

receive a set of 2D sonar return data received by at least two transducer elements traversing a body of water;

generate a 3D matrix based on a plurality of sets of 2D sonar return data received as the at least one transducer element traverses the body of water, wherein the 3D matrix comprises a plurality of sonar returns defined by each of the received plurality of sets of 2D sonar return data, wherein each of the plurality of sonar returns defines a strength value, a distance value, and an angle;

determine, based on at least the angle of each of the plurality of sonar returns and at least one of the strength value or the distance value of each of the plurality of sonar returns, a group of some of the plurality of sonar returns in the 3D matrix that correspond to the bottom surface of the underwater environment, wherein determining the group of some of the plurality of sonar returns in the 3D matrix comprises:

generating, based on the distance value and the angle of each of the plurality of sonar returns, a 3D representation of all of the plurality of sonar returns in the 3D matrix such that each of the plurality of sonar returns defines an x coordinate, a y coordinate, and a z coordinate;

determining a plurality of clusters based on at least some of the plurality of sonar returns in the 3D representation, wherein each of the plurality of clusters comprises sonar returns that are within a threshold distance of each other within the 3D representation; and selecting a cluster with the largest number of sonar returns from among the plurality of clusters such that the sonar returns within the selected cluster form the determined group of some of the plurality of sonar returns in the 3D matrix that correspond to the bottom surface of the underwater environment; and generate a 3D representation of the bottom surface of the underwater environment based on the group of some of the plurality of sonar returns in the 3D matrix.

18. The computer program product of claim 17 further comprising the program code portions configured, when said program product is run with a sonar signal processor, to display the 3D representation of the bottom surface of the underwater environment.

* * * * *